Base Currents Transistors Tr1/Tr2
Collector Currents Tr1/2 = Base Currents Tr3/Tr4
Collector Currents Tr3/Tr4
a+, b−    a−−, b+

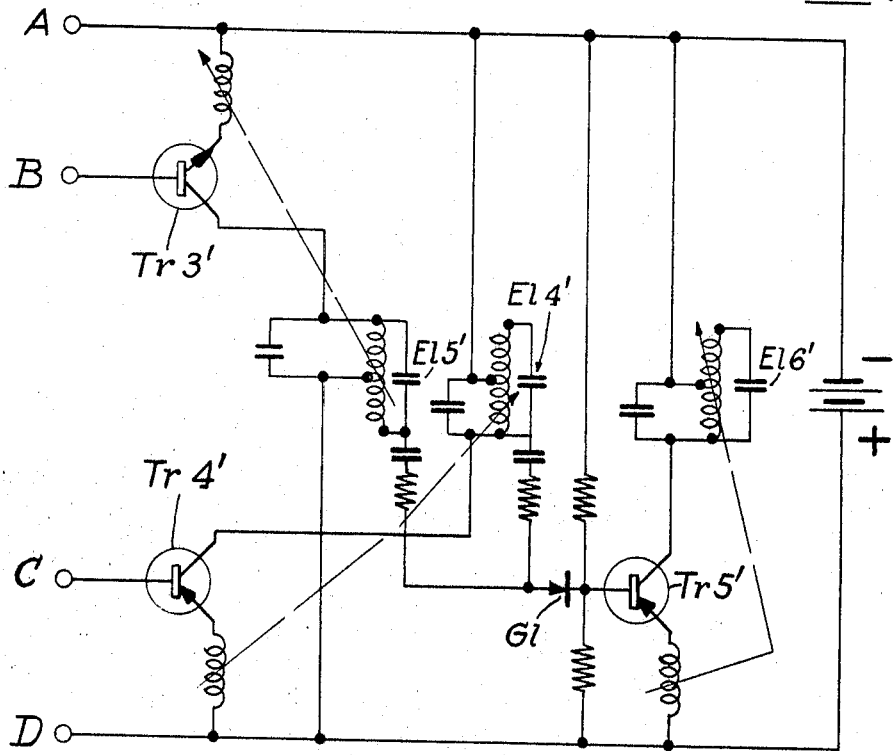
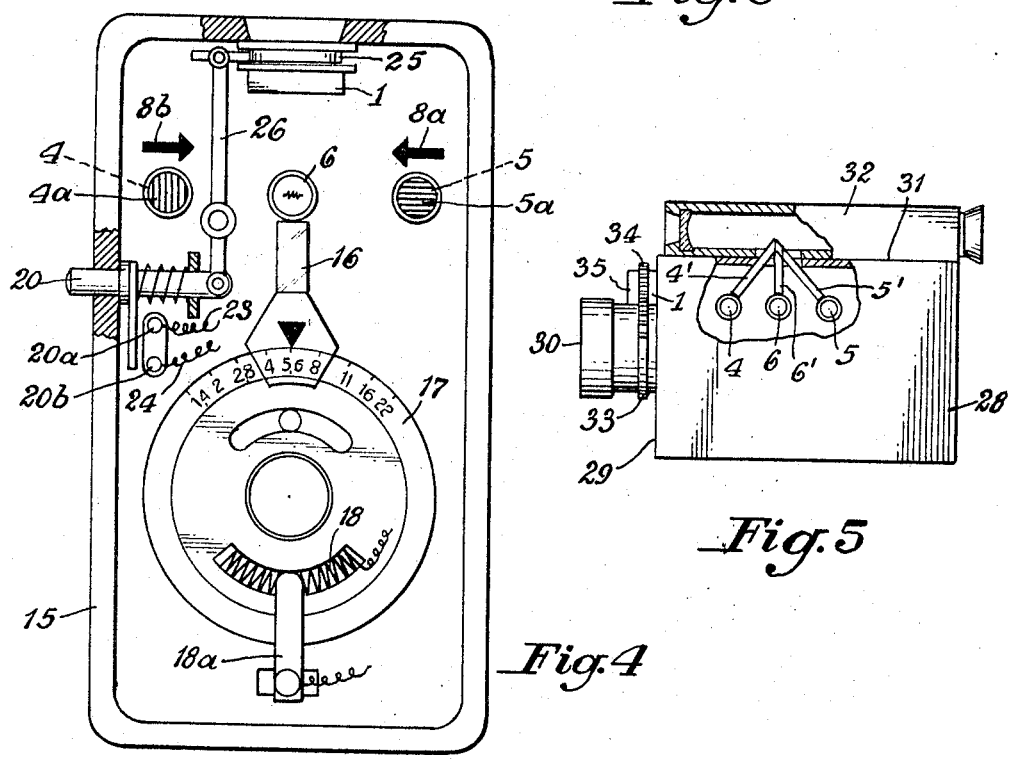

United States Patent Office 3,452,656
Patented July 1, 1969

3,452,656
PHOTOMETER WITH PHOTOELECTRIC TRANSFORMER
Hans Rühle and Ulrich Schöttle, Stuttgart, and Heinz Thiele, Leinfelden, near Stuttgart, Josef Schwahn, Stuttgart, and Arno Ritze, Stuttgart-Mohringen, Germany, assignors to Zeiss Ikon Aktiengesellschaft, Stuttgart-S, Germany
Filed Oct. 4, 1965, Ser. No. 492,467
Claims priority, application Germany, Oct. 31, 1964, Z 11,148; Feb. 27, 1965, Z 11,371; Aug. 4, 1965, Z 11,692, Z 11,391
Int. Cl. G01j 1/46
U.S. Cl. 95—10                                                                 9 Claims

ABSTRACT OF THE DISCLOSURE

A photometer for photographic purposes in which a photoresistor is arranged in one branch of a Wheatstone bridge circuit of which the other branches contain resistors representing exposure influencing values. The bridge circuit is energized by a source of current and is connected with a transistorized indication circuit containing at least one signal means which becomes visible when the bridge circuit is balanced. Preferably, the transistorized indication circuit contains three signal means, for instance lamps, one of which is energized at a time in such a manner that one lamp lights up when the bridge circuit is in balance, while another lamp lights up when the bridge circuit is out of balance a predetermined amount of voltage below zero, and the third lamp lights up when the bridge circuit is out of balance a predetermined amount of voltage above zero.

---

This invention relates to a photometer having a photoconductive cell in which the voltage generated by incident light, or voltage variations caused by resistance changes due to incident light, are fed directly or, when employing the photometer for exposure-time determination in photography, indirectly into a measuring circuit by way of interposed mechanical and/or electrical control members taking into account photographic factors such as film speed, shutter speed, lens opening or other exposure time values.

The voltages derived from the photoconductive cell, or the current variations caused by photoresistance changes, are generally of such small magnitude that only extremely sensitive measuring instruments, mostly in the form of moving-coil instruments, can be used for photographic exposure measurements. Such instruments, however, are not only expensive but very delicate and sensitive to external influences such as certain positions and shocks.

It is one of the many objects and aims of this invention to overcome the difficulties caused by delicate instruments by replacing them by simpler indicating means. For indicating the voltage derived from the measuring circuit, there is provided, according to this invention, at least one indicator light, for instance, a glow lamp which glows up only when the voltage of the measuring circuit reaches the starting or ignition voltage of the lamp. Since the ignition voltage is a characteristic value of a particular glow lamp, several glow lamps each designed for different ignition potentials may be employed to indicate various corresponding voltages of the measuring circuit, which voltages in turn correspond to various settings of the control members provided in the measuring circuit.

It is also possible to use incandescent lamps instead of glow lamps for indicating purposes. These incandescent lamps are combined with control means, which allow for lighting up of the lamps only when certain predetermined potential values, as given by selection and setting of control means, are reached. In this manner it is, for instance, possible to determined predetermined maximum and minimum potentials by connecting to the incandescent lamps in series or parallel Zener diodes or thyratrons. Thus the lamps will light up or become extinct, depending on the setting of the control members, when the limit potentials are reached.

Since photoconductive cells produce only very low potentials, it may become necessary to include one or several stages of amplification in the indicator light circuit.

The photometer of this invention can be used, depending on the number of indicator lamps employed, for indicating several potential values corresponding to different light intensities. Moreover, it is also possible to adapt this photometer for the zero method, whereby the voltage of the photoconductive cell is compared with a reference voltage established by setting of control members in the measuring circuit. In case the photometer shall serve as exposure meter in photography, the control members have the purpose of establishing a reference voltage in dependence of the factors to be considered for taking a particular picture. To achieve this end in accordance with the invention, it is proposed to employ as measuring circuit a Wheatstone bridge arrangement in which a photoresistor, serving as photoconductive cell, forms one arm of the bridge. At least a second adjustable resistance or rheostat serves as bridge balancing unit and the magnitude of it is a measure for the light intensity to be found and is made readable on a graduated scale. In order to be able to introduce other exposure factors to be considered, there can be arranged additional rheostats in the bridge circuit for their corresponding adjustment.

Another method of introducing exposure factors in balancing of the bridge makes use of an adjustable diaphragm placed in front of the photoresistor. This diaphragm is operatively associated with a graduated scale which indicates light intensities.

A preferred embodiment of this invention provides for applying the voltage of the bridge to the bases of two parallel-connected complementary transistors with the effect that collector current flows through one of these transistors when the bridge is unbalanced in one direction, and collector current flows through the other transistor, when the bridge is unbalanced in the opposite direction.

To the collector line of one of this first pair of transistors is connected a further n-p-n transistor and to the collector line of the other of this first pair is connected a further p-n-p transistor. The collector lines of both of these last-named transistors are connected to the voltage source of the Wheatstone bridge and have each an indicator lamp interposed in the respective lines. These lamps serve for indicating bridge potentials above and below normal.

In order to be able to indicate also the desired or normal value, that is the condition at which the bridge is balanced and bridge voltage and current is zero, the indicator lamps serving for showing the upper and lower range limits are combined with an additional lamp for indicating the normal value in such manner that now all three lamps lie in series on the voltage source of the Wheatstone bridge. To obtain in this series arrangement lighting of the normal value lamp only, this lamp must have a higher resistance than the cold resistances of the two other lamps. In operation, whenever the bridge is balanced, the transistors in the circuits of both range limit indicator lamps are blocked so that these lamps cannot light, but since their cold resistance is much lower than the cold resistance of the lamp for indicating normal state, and since all three lamps lie in series across the voltage source, only the lamp having high resistance will light and indicate normal value.

The aim of this invention to indicate several potential values of the light intensity measuring device by lighting up of respective lamps can also be materialized in another way apart from the description in the previous paragraph. In accordance with this modification of the invention, the lamp indicating normal voltage has a considerable lower cold resistance than both range limit indicating lamps. Furthermore, a transistor is connected in parallel to each one of the latter lamps which, when the bridge is balanced, short-circuit both lamps so they will not light. On the other hand, when balanced conditions do not exist in the bridge, only one of the range limit indicating lamps is shorted out, whereas, owing to the lower resistance of the normal indicating lamp, the other range limit indicating lamp will light.

In order to control the transistors arranged in parallel to the range limit indicating lamps in the manner set forth, either the bridge potential terminals on which the measuring voltage exists—or the collector lines of a transistor complementary pair across the bridge potential terminals, if such a pair is incorporated in the circuit—are connected each to the base of an additional transistor. The emitters of both of these transistors are connected directly to one terminal of the voltage source of the measuring circuit; and the collector lines, to the other terminal of the source, each by way of a resistor interposed in the respective connecting line. The base of each transistor arranged in parallel to the range limit indicating lamps is connected to a collector of a transistor arranged in series with the first-named transistor.

For a clear indication of the direction in which the control members have to be actuated for reaching normal value, this invention provides for providing the indicator lamps for range limits with certain configurations, or with setting masks which show such directions. It may also be advisable to mark the range indicating lamps and also the normal value lamp with appropriate colors, for example, by providing suitable color filters.

Incandescent lamps as indicator lights have relatively high energy consumption during the measuring procedure and require rather voluminous batteries to assure sufficient life. Moreover, incandescent lamps require for economical operation inherently higher voltages as can be delivered by a single photocell, and it takes therefore several photocells in series for operating the photometer.

To make operation with smaler batteries possible, this invention provides in a modified arrangement for utilization of electroluminescence plates as indicating means for the various voltage values. Such light sources, compared with incandecsent lamps, require considerably less electric energy for emission of light. This energy for exciting electroluminescence plates, however, has to be in the form of alternating current in the audio frequency range, preferably in the order of 5 kilocycles at an operating voltage of about 100 volts. Since electroluminescence plates require so very little energy—their electrical equivalent circuit, as well known in the pertaining art, represents a capacitor—their power can be taken from a D-C source of, say, 1.5 volts by means of transistorized audio frequency generators. In a preferred arrangement of this kind, the measuring voltage, for instance, the bridge potential of the Wheatstone bridge, is applied to the bases of a complementary transistor pair. In such a circuit, a collector current will flow through one transistor when the bridge is unbalanced in one direction, and a collector current will flow through the other transistor when the bridge is unbalanced in the opposite direction. Inserted in the collector lines of the first pair of transistors are two further transistors, one in each line, which preferably are in the form of audio frequency generators. The frequency determining oscillatory circuits lie in the collector circuits of the last-mentioned transistors and are inductively coupled each with a coil inserted in each emitter line of these transistors. The voltage of these coils in the collector circuit is preferably transformed by autotransformers to a level required for operation of electroluminescence plates.

For balanced condition of the bridge, i.e., for example, when the measuring voltage is zero, there is provided an additional transistor which is connected to a further electroluminescence plate and is connected in analogous manner to the last-mentioned transistors so that in balanced condition of the bridge, an alternating voltage is produced by a feedback causing lighting of the respective electroluminescence plate, indicating a balanced bridge and normal voltage condition.

To prevent a lighting of the last-named plate when the bridge is unbalanced, the invention provides that in case of bridge unbalance, the voltages at the upper and lower range limit electroluminescence plates shift the operating point of the transistor for balanced bridge indication, thereby stopping its collector current flow and, in turn, darkening its electroluminescence plate.

For generating the voltage of audio frequency necessary for lighting the electroluminescence plates, there can also be used a separate generator that may be available so that then the transistors serve only as electronic switches for the respective electroluminescence plates.

Another feature of this invention which allows smaller batteries and less energy consumption is the application of semiconductor diodes, such as diodes of gallium arsenide, which light up when a current passes through the same, for indicating the various measuring voltages.

Such light-emitting elements have considerable advantage over the afore-mentioned indicator lamps and other indicating means. For instance, they have smaller physical dimensions, they are insensitive against shocks, and their light emission depends on the the direction of current flow, which last advantage results in a considerable simplification of the circuits. Their light emission is practically void of any measurable heat development. Owing to their simple structure, such semiconductor diodes can be readily incorporated in electronic circuits.

The room in which a photographic picture is to be taken is not always sufficiently illuminated to read with ease the graduation on the scale of the photometer to determine the exposure time. Up to the present time it was customary to provide the light meters for the purpose of scale reading with small individual flash light with which the scales could be illuminated. Such an inconvenient operation of an exposure meter can be avoided when, as in a further improvement of the invention, one of the indicator lamps, preferably the lamp for indicating the normal value, is utilized, either by its location or by the arrangement of suitable light-conducting media, for illuminating the scale graduation, which scale is preferably made of translucent material. It is also possible to use not only the normal value indicator lamp but also all lamps in the device for illuminating the scale, because then it is possible to examine the setting of the adjustment members during the whole adjusting process and not only after the normal value has been set.

As generally known, photoresistors have a very high degree of sensitivity so that already under the lowest light influence, the measuring and control devices begin to react, and therefore, the danger exists that the energy source becomes gradually exhausted when the exposure meter is left in a room which is not completely dark. To safeguard the battery against such exhaustion, the present invention provides a switch for disconnecting it from the measuring and control circuit when the device is not in use. This switch is preferably not arrested in its closed position so that it must be held depressed by the fingers holding the camera and must be held down to make the operation of the measuring and control circuit possible.

This switch may be operatively associated with one of the actuating members of the rheostats, or with the adjustable diaphragm in front of the photoresistor, so that it is operated in the direction of the respective actuating member or transverse thereto, for instance, at the beginning of such manipulation and only after pressure is applied, for instance, on the setting scale surface, to thereby switch the battery into the measuring and control circuit.

Furthermore, it is of advantage to subject the photoelectric transformer and particularly the photoresistor only to light of low intensities and moderate brightness variations, because otherwise there are likely to occur inertia effects which make measurements more difficult. In order to avoid such undesirable effects, this invention provides for a lightproof diaphragm in front of the photoresistor, which is operated by a key used for controlling the battery switch. However, even then it can happen that the photometer receives too much light and shows inertia effects, for instance, when the control diaphragm is open at the beginning of measurement. In order to avoid this disadvantage, this invention provides for coupling of the lightproof diaphragm with the control diaphragm in front of the photoconductive cell in such way that only at the smallest aperture setting of the control diaphragm, the lightproof diaphragm can be moved out of the light path to the photoconductive cell.

A complete shutoff of light from the photoresistor can also be achieved by a total closing of the control diaphragm.

In the event that the measuring device, having the novel features of this invention as enumerated above, is used as an integral part of a photographic camera, the control members of the measuring instrument are preferably operatively connected with the setting members of the camera, for example, with the diaphragm adjusting ring and/or the shutter speed adjusting ring. In such arrangement, the indicator lamps are preferably positioned in recesses of the camera housing to be directly visible and/or visible when looking into the viewfinder; or, if such arrangement is impossible, are made visible by interposing suitable light-conducting elements.

The invention will now be explained more fully with reference to the drawings showing basic circuit diagrams of some preferred embodiments.

FIG. 3 is another partial basic circuit diagram showing the modifications in the circuit of FIG. 1 for using electroluminescence plates as indicating means for various voltage values;

FIG. 4 is a diagrammatic view of a photographic camera equipped with a photometer in accordance with the invention;

FIG. 5 is a diagrammatic view of a photographic camera equipped with a somewhat modified photometer in accordance with the invention;

Figure 1:
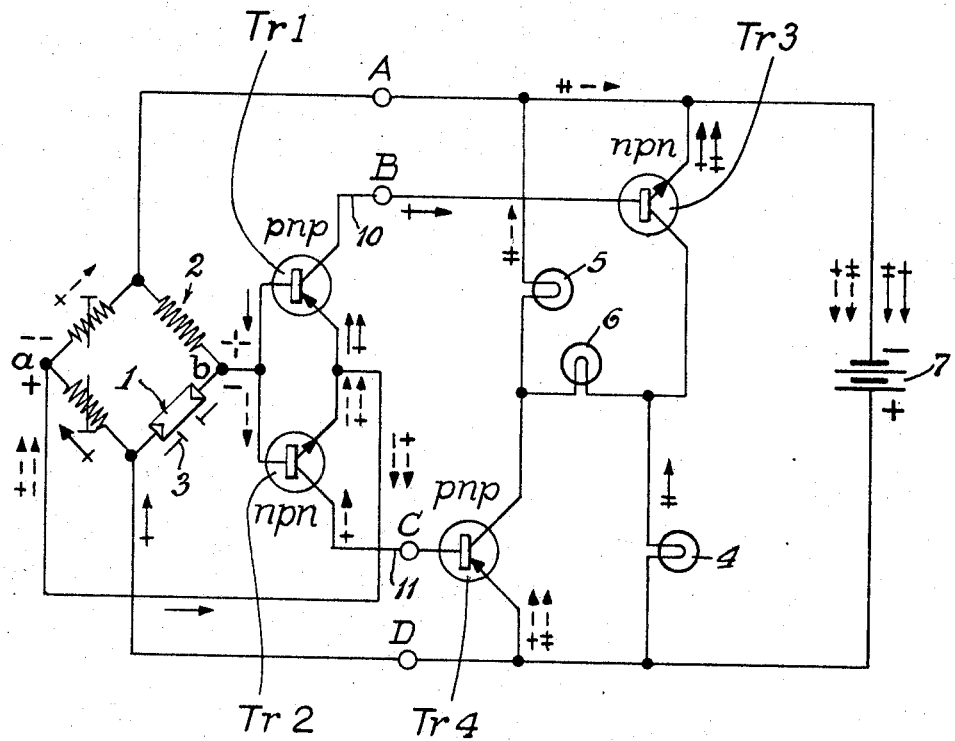
FIG. 1 is a complete basic circuit diagram of an embodiment in which the cold resistance of the standard value indicator lamp is higher than the cold resistance of both the range limit indicator lamps.

Referring now to FIG. 1, a photoresistor 1 is arranged in one of the four branches of the Wheatstone bridge 2. The other branches of the bridge circuit may have arranged therein, fixed resistors and variable resistors or rheostats, whereby one of the variable resistors or rheostats serves for balancing the bridge circuit, and the other variable resistors or rheostats serve as controls for entering factors that have to be considered in light-intensity measurements. In place of a rheostat, there can be arranged an adjustable diaphragm 3 in front of the photoresistor 1. The bridge circuit is energized by a battery 7, and the bridge potential between the points $a$ and $b$ is applied to the bases of two parallel-connected, complementary transistors $Tr1$ and $Tr2$. Depending on the direction in which the bridge circuit is out of balance, there flows current either through one or the other of the two transistors $Tr1$ and $Tr2$. The collector lines of these transistors are connected with the bases of a further n-p-n transistor $Tr3$ and a further p-n-p transistor $Tr4$ respectively, forming parts of an indication circuit. The collectors of these last transistors are connected to the power source 7 of the Wheatstone bridge by means of indicator lamps 4 and 5 respectively serving for indicating a bridge potential at the points $a$ and $b$ when this is above or below a standard value. The directions of the current flow in the circuits are indicated by arrows. The full-line arrows indicate the current flow when a negative potential exists at point $b$, the dotted arrows indicate current flow in case of a positive potential at $b$. The arrows having one cross dash indicate current flow amplified by passing through one transistor, and the arrows having two-cross dashes indicate current flow amplified by passing through the other transistor. For instance, when the bridge potential is negative at point $b$, lamp 4 will light up and indicates thereby the low voltage range limit. On the other hand, if the potential relationship in the bridge circuit is reversed, the lamp 5 will light up and indicates the high voltage range limit. In the event the bridge is balanced, all of the transistors are blocked and a lamp 6 arranged in this condition in series with the lamps 4 and 5 will light up. By inspection of the circuit, it can be seen that under this condition all three lamps 4, 5 and 6 are arranged in series with the battery 7. It is to be noted that the resistance of the lamps 4 and 5 is much lower than that of the resistance of the lamp 6; in fact, there is not enough voltage drop across these lamps to make them light, but only the lamp 6, having higher resistance, will cause a sufficient voltage drop so that its operating voltage makes it light up. Thus, lighting of the lamp 6 indicates a balanced condition of the bridge circuit. Since the adjustment of the variable resistor in the bridge circuit can be read on a graduated scale, the determined value is found in the same manner as with known exposure meters.

Figure 2:
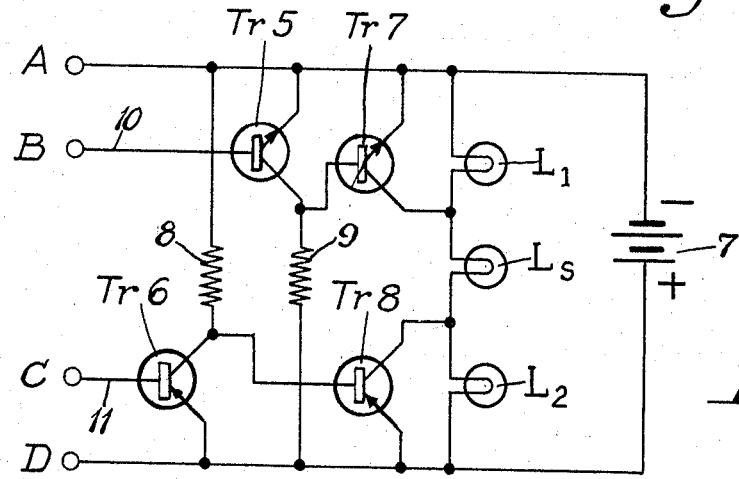
FIG. 2 is a partial basic circuit diagram showing the modifications in the circuit of FIG. 1 of using a standard value indicator lamp whose cold resistance is considerably lower than the cold resistance of the range limit indicator lamps.

The circuit of FIG. 2 illustrates only the right-hand modified portion of the indication circuit of FIG. 1 as separated at the points A, B, C and D. The not illustrated left-hand portion of the circuit is completely the same as the respective circuit portion of FIG. 1. As shown in in FIG. 2, a transistor $Tr7$ is arranged in parallel to the lamp $L_1$, and a transistor $Tr8$ is arranged in parallel to the lamp $L_2$. The collector lines 10 and 11 of the transistors $Tr1$ and $Tr2$ (FIG. 1) are connected to the bases of transistors $Tr5$ and $Tr6$ respectively. The emitter of transistor $Tr5$ is connected to the negative terminal and the emitter of $Tr6$, to the positive terminal of the voltage source 7. Moreover, the collector of transistor $Tr5$ is connected by means of a resistor 8, to the positive terminal of the voltage source 7 and is also connected directly to the base of the transistor $Tr7$. Analogously, the collector of the transistor $Tr6$ is connected to the negative terminal of the voltage source by means of a resistor 9, and also directly to the base of the transistor $Tr8$. The transistors $Tr5$ and $Tr6$ form a complementary transistor pair; and the transistors $Tr7$ and $Tr8$ form another such pair. The indicator lamp $L_S$ arranged in series with the lamps $L_1$ and $L_2$ has a considerably lower cold resistance than the two other lamps $L_1$ and $L_2$. In the balanced condition of the bridge circuit, namely when the bridge potential is zero and no voltage exists in leads 10 and 11 and at the bases of transistors $Tr5$ and $Tr6$, the transistors $Tr7$ and $Tr8$ short-circuit the lamps $L_1$ and $L_2$ with the effect that now lamp $L_S$ receives the full battery voltage and will light up. In the unbalanced condition of the bridge circuit, one of the transistors Tr7 or Tr8 becomes currentless and the other short-circuits the lamp in parallel arrangement with it. For example, if insufficient light reaches the photoresistor, the transistor Tr7, for instance, becomes currentless and the transistor Tr8 short-circuits the lamp $L_2$. Because of the different cold resistance of the lamps $L_1$ and $L_s$, the lamp $L_1$ will now light up and thereby indicates that insufficient light exists for a photographic exposure. Under reversed condition, i.e. in case it is too bright, the transistor Tr8 becomes currentless and the transistor Tr7 short-circuits the lamp $L_1$ so that only the lamp $L_2$ will light due to its higher cold resistance with respect to lamp $L_s$.

The circuit of FIG. 3 illustrates an arrangement with electroluminescence plates as indicator means. Also in this FIG. 3 only the modified right-hand portion of the circuit in FIG. 1 is illustrated, again as separated at the points A, B, C and D, and the left-hand portion of the circuit is the same as the left-hand portion of FIG. 1. In this modification, the transistors Tr3' and Tr4' are arranged in the form of feedback audio frequency generators. The frequency-determining oscillatory circuits are located each in the respective collector circuits and the feedback is effected inductively into coils arranged in the respective emitter lines. The oscillator coil, arranged in the collector line, can be constructed in such a manner that by autotransformer action the audio frequency voltage is stepped up to a level necessary for the operation of electroluminescence plates. Owing to the capacitive character of the electroluminescence plates, they present primarily a capacitive load and take very little effective power from the battery circuit. Both of the transistors Tr3' and Tr4' are blocked when the bridge circuit is balanced. Under this condition no collector current can flow in these transistors, and consequently, no oscillations are produced and the electroluminescence plates E$l$4' and E$l$5' remain dark. However, when this condition exists, there is generated an audio frequency voltage by feedback in a transistor Tr5', which is connected in a similar manner as the transistors Tr3' and Tr4', and produces an alternating voltage by feedback and applies the same to the electroluminescence plate E$l$6' and causes it to light up. Therefore, this plate E$l$6', when lit up, will indicate a balanced bridge circuit.

Whenever the bridge circuit is unbalanced, there lights up either the electroluminescence plate E$l$4' or E$l$5', and a voltage is applied to the rectifier G1, which voltage shifts the operating point of the transistor Tr5' and thereby interrupts its collector current so that the excitaion of elecroluminescence plate E$l$6' is interrupted, thereby causing it to become dark.

In contrast to the circuit described in FIG. 3, there can also be employed a separate audio frequency generator, in which case the transistors Tr3', Tr4' and Tr5' serve only as switches for the current supply to the electroluminescence plates.

Referring to FIG. 4, the meter casing 15 has disposed thereon the lamps 4, 5 and 6 illustrated in FIG. 1, but the lamps 4 and 5 are covered by filters 4a and 5a of different colors indicated by the different hatchings. These filters 4a and 5a have also placed thereon direction marks 8a and 8b respectively, which for sake of illustration are shown above the filters in FIG. 4. Within the range of the lamp 6 is arranged in a light-conductive rod 16, whose one end terminates below the diaphragm aperture indicating disc 17, which is operatively connected with a potentiometer 18, 18a which corresponds to one of the resistors in one of the branches of the bridge circuit 2 of FIG. 1. A push-button switch 20 is adapted to connect two contacts 20a and 20b, which are connected by the lines 23 and 24 with the battery 7 (FIG. 1). In front of the photoelectric transformer 1 is arranged a light-proof diaphragm 25, which by a linkage 26 is operatively connected with the switch 20 and is moved to open position when the switch is closed and to a closed position when the switch 20 is opened.

FIG. 5 illustrates another arrangement of the photometer on a photographic camera. The camera casing 28 has mounted on its front wall 29 a photographic objective 30 and on its top wall 31 a viewfinder 32. A diaphragm adjusting ring 33 for the camera objective is mounted concentrially on the mount of the objective 30 and is operatively connected by a gearing or the like with the diaphragm adjusting ring 34 of a diaphragm 35 disposed in front of the photoresistor 1. The lamps 4, 5 and 6, when energized, direct their light by means of the light-conductive rods 4', 5' and 6' into the viewfinder 32 to be observed by the photographer when he looks into the viewfinder 32 to observe the image of the subject to be photographed.

Figure 6:
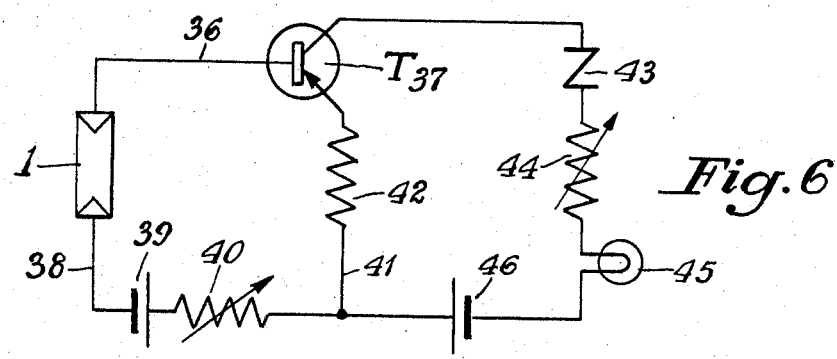
FIG. 6 is a circuit diagram of a photometer in accordance with the invention which employs a Zener diode in its measuring circuit.

The circuit diagram illustrated in FIG. 6 illustrates the employment of a Zener diode in the photometer of the invention. The photoresistor 1 (the same as is used in FIG. 1) is connected by a line 36 with the base of a transistor $T_{37}$ and by a line 38 with a battery 39 which energizes the photoresistor circuit. A variable resistor 40 is arranged in series with the battery 39 and serves for the adjustment of the working point of the transistor $T_{37}$ and for the introduction of exposure factors, such as film speed, filter factors, etc. In the line 41 between the variable resistor 40 and the emitter of the transistor $T_{37}$ is arranged a protective resistor 42. When the transistor $T_{37}$ is open, an emitter-collector current flows in the circuit which controls the voltage of the measuring circuit. The latter includes in series arrangement the Zener diode 43, a current limiting resistance 44, which may be variable, a signal lamp 45 and a battery 46. When the photoresistor 1 is subjected to a predetermined illumination, a predetermined voltage is produced in the measuring circuit, and this voltage as controlled by the Zener diode 43 causes the lamp 45 to light up at a predetermined voltage.

Figure 7:
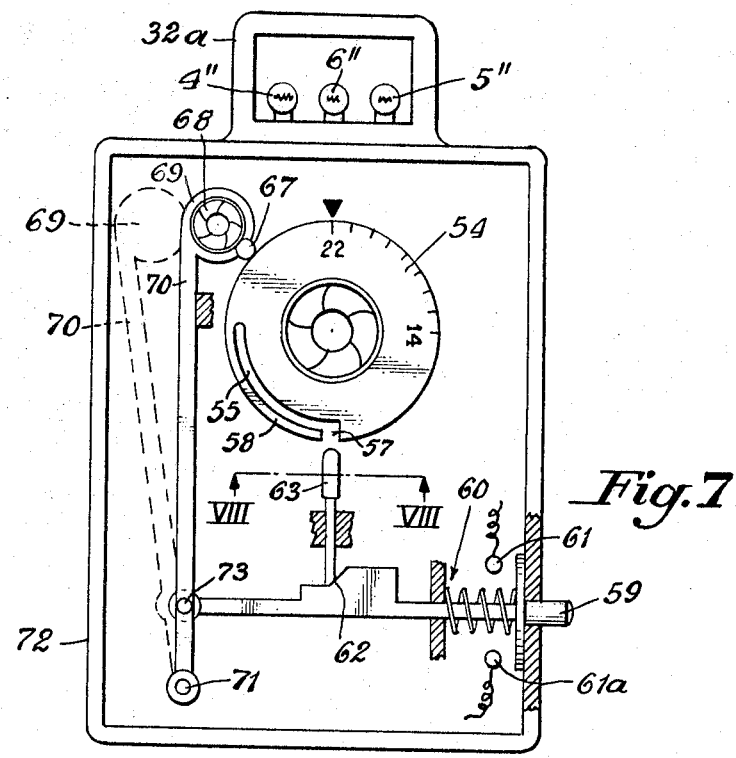
FIG. 7 is a front elevation view of another photographic camera equipped with the photometer of the invention.
Figure 8:
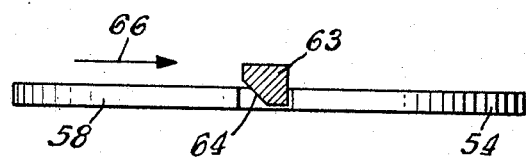
FIGS. 8 and 9 illustrate two views of details in different positions along the sectional line VIII—VIII in FIG. 7.
Figure 9:
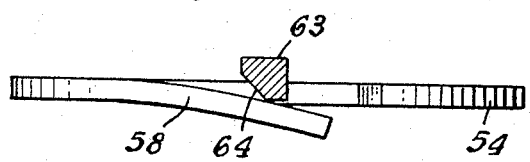

Referring to FIG. 7, which diagrammatically illustrates a photographic camera in front elevation with the front wall removed and equipped with a photometer in accordance with the invention, it will be noted that the diaphragm aperture adjusting ring 54 is provided with an arc-shaped recess 55 extending in circumferential direction which with the exception of the portion 57, which corresponds to the smallest diaphragm aperture, is covered by a resilient segment 58. In the position of the adjusting ring 54 illustrated in FIG. 7, an operation of the switch 60, 61, 61a causes the cam 62 on the switch rod 59 to move a vertically slidable pin 63 to enter the recess portion 57. The switch rod 59 is only then operable when the diaphragm aperature adjusting ring 55 has been adjusted to the smallest value $f$:22. In order to be able to adjust in this position of the switch the diaphragm aperture adjusting ring 54 to other diaphragm aperture values, the pin 63 is provided at one side, as shown in FIG. 8 with an inclined face 64, so that when the ring 54 is moved in the direction of the arrow 66, the resilient segment 58 may yield and flex sideways as shown in FIG. 9. The diaphragm aperture adjusting ring 54 is operatively connected, for instance, by a gear clutch 67 with the adjustable diaphragm 68 arranged in front of the photoresistor. Between the latter and the adjustable diaphragm 68 is arranged a light-proof diaphragm 69, which is attached to the upper end of a lever arm 70, the lower end of which is pivotally supported at 71 in the camera casing 72. The longitudinally movable switch rod 59 at its inner end is pivotally attached at 73 to a point of the lever arm 70 slightly spaced from its pivot point 71. As shown, the light-proof diaphragm 69 can only be moved away from the photoresistor into the position shown in FIG. 7 in dash lines when the adjustable diaphragm 68 has been adjusted to its smallest aperture.

In FIG. 7 is also illustrated a viewfinder 32a, which is similar to the viewfinder in FIG. 5. The images of the lighted lamps 4, 5 and 6 appearing in the viewfinder are indicated with 4″, 5″ and 6″ respectively.

All of these embodiments of the invention have the advantage that the use of a complicated moving-coil instrument with its sensitiveness to positioning and shocks and delicateness is completely avoided. Moreover, a rotatable mounting of a follow-up indicator becomes unnecessary. All components of the disclosed exposure meter can be constructed and mounted sufficiently insensitive and shockproof.

What we claim is:

1. A photometer comprising in combination, means forming a Wheatstone bridge circuit, means forming an indication circuit connected to said bridge circuit, said bridge circuit including a photoresistor in one of its branches, resistor means in the other three branches thereof, some of said resistor means being variable for controlling the balance of said bridge circuit and for introducing exposure influencing values, and a source of current for energizing said bridge circuit, said indication circuit including three signal means adapted to be rendered visible one at a time, and means controlling said signal means in such a manner that one of said signal means becomes visible when said bridge circuit is in balance, while another one becomes visible when the bridge circuit is a predetermined amount of voltage below zero out of balance, and the third signal becomes visible when the bridge circuit is a predetermined amount of voltage above zero out of balance, said indication circuit also including two parallel arranged complementary transistors, to the bases of which the bridge voltage of said Wheatstone bridge is applied, the arrangement of said transistors being such that upon unbalance of said bridge circuit in one direction a collector current will flow in one of said transistors, while upon unbalance of the bridge circuit in the other direction a collector current will flow in the other transistor, and two additional n-p-n and p-n-p transistors respectively arranged in the collector lines of said first mentioned transistors and connected each by means of one of said signal means with said source of current of said Wheatstone bridge circuit, said signal means when rendered visible indicating a too low and a too high voltage respectively.

2. A photometer comprising in combination, means forming a Wheatstone bridge circuit, means forming an indication circuit connected to said bridge circuit, said bridge circuit including a photoresistor in one of its branches, resistor means in the other three branches thereof, some of said resistor means being variable for controlling the balance of said bridge circuit and for introducing exposure influencing values, and a source of current for energizing said bridge circuit, said indication circuit including three signal means adapted to be rendered visible one at a time, and means controlling said signal means in such a manner that one of said signal means becomes visible when said bridge circuit is in balance, while another becomes visible when the bridge circuit is a predetermined amount of voltage below zero out of balance, and the third signal becomes visible when the bridge circuit is a predetermined amount of voltage above zero out of balance, said indicating circuit also including two parallel arranged complementary transistors, means for applying the bridge voltage of said Wheatstone bridge circuit to the bases of said transistors, the arrangement of said transistors being such that upon unbalance of said bridge circuit in one direction a collector current will flow in one of said transistors, while upon unbalance of the bridge circuit in the other direction a collector current will flow in the other transistor, and two additional n-p-n transistors and p-n-p transistors, respectively, arranged in the collector lines of said first-mentioned transistors and connected each by means of one of said signal means with said source of current of said Wheatstone bridge circuit, said signal means indicating a too low and a too high voltage respectively, said last mentioned two signal means being conductively connected with the remaining third signal means in such a manner that all these three signal means are arranged in series and with the two terminals of said source of current, said third signal means having a higher resistance than the cold resistance of said two other signal means so that upon blocking of the two transistors associated with said firstmentioned two signal means only the third signal means will become visible.

3. A photometer comprising in combination, means forming a Wheatstone bridge circuit, means forming an indication circuit connected to said bridge circuit, said bridge circuit including a photoresistor in one of its branches, resistor means in the other three branches thereof, some of said resistor means being variable for controlling the balance of said bridge circuit and for introducing exposure influencing values, and a source of current for energizing said bridge circuit, said indication circuit including three signal means adapted to be rendered visible one at a time, and means controlling said signal means in such a manner that one of said signal means becomes visible when said bridge circuit is in balance, another one becomes visible when the bridge circuit is a predetermined amount of voltage below zero out of balance, and the third signal becomes visible when the bridge circuit is a predetermined amount of voltage above zero out of balance, and including light conductive means extending from at least one of said three signal means to a scale which indicates the measured value.

4. A photometer comprising in combination, means forming a Wheatstone bridge circuit, means forming an indication circuit connected to said bridge circuit, said bridge circuit including a photoresistor in one of its branches, resistor means in the other three branches thereof, some of said resistor means being variable for controlling the balance of said bridge circuit and for introducing exposure influencing values, and a source of current energizing said bridge circuit, said indication circuit including at least one signal means adapted to be rendered visible, control means causing said last signal means to become visible at a predetermined voltage which balances the bridge circuit, a removable light-proof diaphragm arranged in front of said photoresistor, and means operatively connecting said diaphragm with a switch adapted to disconnect the source of current which energizes said measuring circuit.

5. A photometer according to claim 4, including a variable diaphragm in front of said photoresistor and means operatively connecting said variable diaphragm with said removable diaphragm in such a manner that the latter is only removable when said variable diaphragm has been adjusted to its smallest aperture.

6. A photometer comprising in combination, means forming a Wheatstone bridge circuit, means forming an indication circuit connected to said bridge circuit, said bridge circuit including a photoresistor in one of its branches, resistor means in the other three branches thereof, some of said resistor means being variable for controlling the balance of said bridge circuit and for introducing exposure influencing values, and a source of current for energizing said bridge circuit, said indication circuit including three signal means adapted to be rendered visible one at a time, and means controlling said signal means in such a manner that one of said signal means becomes visible when said bridge circuit is in balance, another one becomes visible when the bridge circuit is a predetermined amount of voltage below zero out of balance, and the third signal means becomes visible when the bridge circuit is a predetermined amount of voltage above zero out of balance, said signal means arranged to become visible when the bridge circuit potential is zero having a substantially lower cold resistance than the two other signal means, a transistor being arranged in parallel to each of said two other signal means, said two transistors being arranged to short-circuit said two other signal means when the bridge circuit is balanced, but to cause one of said two signal means to become visible when the bridge circuit is unbalanced because the resistance of the signal means which is visible at a balanced condition of the bridge is too low.

7. A photometer comprising in combination, means forming a Wheatstone bridge circuit, means forming an indication circuit connected to said bridge circuit, said bridge circuit including a photoresistor in one of its branches, resistor means in the other three branches thereof, some of said resistor means being variable for controlling the balance of said bridge circuit and for introducing exposure influencing values, and a source of current for energizing said bridge circuit, said indication circuit including at least one signal means adapted to be rendered visible, control means causing said last signal means to become visible at a predetermined voltage which balances the bridge circuit, the bridge circuit potential ($a$, $b$) being applied to the base of a pair of parallel arranged complementary transistors ($Tr1$, $Tr2$) whose collectors are connected each with the bases of an additional transistor ($Tr5$, $Tr6$), the emitters of which are connected with one terminal of said source of current, while the respective collectors are connected by means of a resistance (8, 9) with the other terminal of said source of current, and including two more transistors ($Tr7$, $Tr8$) arranged in parallel to the two lamps ($L_1$, $L_2$) and whose bases are connected with the collectors of the preceding transistors ($Tr5$, $Tr6$).

8. A photometer comprising in combination, means forming a Wheatstone bridge circuit, means forming an indication circuit connected to said bridge circuit, said bridge circuit including a photoresistor in one of its branches, resistor means in the other three branches thereof, some of said resistor means being variable for controlling the balance of said bridge circuit and for introducing exposure influencing values, and a source of current for energizing said bridge circuit, a transistor circuit connected with the diagonal points of said bridge circuit and controlled by said bridge circuit, an indicating circuit controlled by said transistor circuit and including three signal means adapted to be rendered visible one at a time, and means controlling said signal means in such a manner that one of said signal means becomes visible when said bridge circuit is in balance, another one becomes visible when the bridge circuit generates a voltage below zero out of balance, and the third signal means becomes visible when the bridge circuit generates a voltage above zero out of balance.

9. A photometer comprising in combination, means forming a Wheatstone bridge circuit, means forming an indication circuit connected to said bridge circuit, said bridge circuit including a photoresistor in one of its branches, resistor means in the other three branches thereof, some of said resistor means being variable for controlling the balance of said bridge circuit and for introducing exposure influencing values, and a source of current for energizing said bridge circuit, a transistor circuit connected with the diagonal points of said bridge circuit and controlled by said bridge circuit, said transistor circuit comprising two parallel-connected transistors, said transistors being conditioned and arranged in such manner that one of them is conductive when said bridge circuit generates a voltage below zero out of balance and that the other is conductive when said bridge circuit generates a voltage above zero out of balance, and further comprising an indicating circuit including two transistors and three signal means, said lastmentioned transistors being controlled by the first mentioned transistor circuit and connected with said signal means in such manner that one of said lastmentioned transistors switches one of said signal means when the bridge circuit is out of balance in one direction, and that the other of said lastmentioned transistors switches the second signal means when the bridge circuit is out of balance in the other direction, and that all of the aforementioned transistors are currentless, and the third signal means is visible when the bridge circuit in in balance.

References Cited
UNITED STATES PATENTS

| | | | |
|---|---|---|---|
| 2,201,606 | 5/1940 | Bing | 88—24 |
| 2,291,776 | 8/1942 | Wagner | 88—14 |
| 2,655,848 | 10/1953 | Gray | 95—10 |
| 2,773,219 | 12/1956 | Aron | 250—210 |
| 3,227,056 | 1/1966 | Lieser | 95—10 |
| 3,307,460 | 3/1967 | Land | 95—10 |

NORTON ANSHER, *Primary Examiner.*

J. F. PETERS, Jr., *Assistant Examiner.*

U.S. Cl. X.R.

95—64; 250—210; 324—96; 340—233; 356—218